(12) United States Patent
Matsuo et al.

(10) Patent No.: US 8,168,245 B2
(45) Date of Patent: May 1, 2012

(54) METHOD FOR PRODUCING CORAL POWDER

(75) Inventors: Yoshiaki Matsuo, Tokyo (JP); Kokichi Hanaoka, Nagano (JP); Ryouichi Ohtsubo, Tokyo (JP); Atsuyoshi Murakami, Tokyo (JP); Masahiro Kawano, Tokyo (JP)

(73) Assignee: Solvent Science Laboratory, Kanagawa (JP)

( * ) Notice: Subject to any disclaimer, the term of this patent is extended or adjusted under 35 U.S.C. 154(b) by 77 days.

(21) Appl. No.: 12/744,391

(22) PCT Filed: Nov. 20, 2008

(86) PCT No.: PCT/JP2008/003420
§ 371 (c)(1),
(2), (4) Date: Aug. 25, 2010

(87) PCT Pub. No.: WO2009/066463
PCT Pub. Date: May 28, 2009

(65) Prior Publication Data
US 2010/0316775 A1    Dec. 16, 2010

(30) Foreign Application Priority Data

Nov. 22, 2007  (JP) ................. 2007-302374
Aug. 12, 2008  (JP) ................. 2008-207585

(51) Int. Cl.
*A23L 3/32*    (2006.01)

(52) U.S. Cl. ........ 426/244; 426/313; 426/643; 426/646; 426/506; 426/520

(58) Field of Classification Search .................... 426/74, 426/244, 641, 643, 646, 506, 520, 313
See application file for complete search history.

(56) References Cited

U.S. PATENT DOCUMENTS

| 4,540,584 | A  | * | 9/1985  | Someya ............... 424/687 |
| 5,084,337 | A  | * | 1/1992  | Someya ............... 428/323 |
| 5,700,503 | A  | * | 12/1997 | Hirota ................. 426/74  |
| 5,811,147 | A  | * | 9/1998  | Yamada .............. 426/532 |
| 6,033,730 | A  | * | 3/2000  | Yoshizumi et al. ... 427/244 |
| 6,171,622 | B1 | * | 1/2001  | Someya et al. ....... 426/74  |
| 2002/0090419 | A1 | * | 7/2002  | Rothlin .............. 426/74  |
| 2007/0254069 | A1 | * | 11/2007 | Tang et al. .......... 426/74  |
| 2010/0129464 | A1 | * | 5/2010  | Suzuki ............... 424/600 |

FOREIGN PATENT DOCUMENTS

| JP | 1-242144 A    | 9/1989 |
| JP | 2005-245265 A | 9/2005 |
| JP | 2006-176483 A | 7/2006 |
| JP | 2007-217351 A | 8/2007 |
| JP | 2007-236851 A | 9/2007 |

* cited by examiner

*Primary Examiner* — Drew E Becker
(74) *Attorney, Agent, or Firm* — Carrier Blackman & Associates, P.C.; Joseph P. Carrier; William D. Blackman

(57) ABSTRACT

A coral is washed with purified water or tap water, and a crushed coral is heat-treated. Proteins and other organic matter are incorporated between calcium molecules in the coral skeleton, and the organic matter is decomposed and released as volatile components. In the skeleton from which organic matter is released, a calcium skeleton having a porous structure is formed, and the surface area of pores is increased. A hydrogen gas can be retained in the structure by adsorbing a hydrogen gas to the pores in such a calcium skeleton a porous structure (micropores). The resulting coral powder, with which ions dissolved in water are easily extracted, shows a low oxidation reduction potential when dissolved in water.

6 Claims, No Drawings

METHOD FOR PRODUCING CORAL POWDER

TECHNICAL FIELD

The present invention relates to a method for producing a coral powder to which a hydrogen gas is adsorbed (attached) and which has an excellent ability to retain the adsorbed hydrogen gas.

BACKGROUND ART

Corals are marine organisms containing calcium carbonate as a principal component with a number of trace metals present in seawater, and coral powder prepared by calcination and grinding of weathered corals is used in, for example, healthy foods to be ingested as a source of minerals.

For example, Patent Document 1 describes a deodorant obtained by crushing a calcified coral into a fine powder, establishing a complete oxygen-free condition in a nitrogen flow, increasing temperature while gradually allowing hydrogen to flow thereinto as a gas stream to adjust the ratio of nitrogen and hydrogen to 8:2 to 6:4, and increasing temperature to 600 to 800° C. to perform reductive calcination, and also describes an anti-oxidant food obtained by applying the deodorant to a healthy food.

Patent Documents 2 and 3 disclose a coral calcium powder to which negative hydrogen ions are added or adsorbed and a method for producing the same. A healthy food having a coral powder to which negative hydrogen ions are adsorbed is published on a website (www.kenko-suiso.com) on the Internet and the like.

Patent Documents 4 and 5 disclose a coral powder as a substance that reacts with water to release hydrogen.

These corals and seashells obtained by calcinating marine organisms are utilized as fertilizers because they are more easily dissolved in water than common calcium materials and smoothly absorbed into plants, have stably sustained effects for a long period, and grow tissue skeleton ducts of crop plants well, so that aqueous solutions containing nutrients are efficiently circulated in plants, and the production efficiency of substances produced by photosynthesis is improved.

Patent Document 1: Japanese Patent Laid-Open No. 2007-236851
Patent Document 2: Japanese Patent Laid-Open No. 2005-245265
Patent Document 3: Japanese Patent Laid-Open No. 2007-217351
Patent Document 4: Japanese Patent Laid-Open No. 2006-176483
Patent Document 5: Japanese Patent Laid-Open No. 2005-007380

DISCLOSURE OF THE INVENTION

Problems to be Solved by the Invention

Patent Document 1 describes that when an obtained calcified fine coral powder comes into contact with water, negative ions are generated. Specifically, metal hydrides are produced by reductive calcination of the calcified fine coral powder, and metal hydrides generate negative ions when they come into contact with water.

In Patent Document 2, a coral calcium powder is mixed with a wheat powder, oxidative calcination is performed at 900° C., and then reductive calcination is performed at 650° C. In Patent Document 3, the method described in Patent Document 2 is cited as a method for adsorbing negative hydrogen ions. In these Patent Documents 2 and 3, a negative hydrogen ion is recognized as active hydrogen (hydride ion), in which one electron is further added to a hydrogen element.

When the negative hydrogen ion itself is taken into a living body, an electron can be released from the negative hydrogen ion and react with oxygen to induce active oxygen species including superoxide, which is harmful to the body. Calcium hydride ($CaH_2$), in which a negative hydrogen ion is adsorbed to calcium, is a very strong base and in contact with water ($H_2O$) vigorously reacts to generate hydrogen, and therefore the calcium hydride in direct contact with a metal may cause an explosion, which is designated as a hazardous material under the Fire Defense Law and cannot be used in vivo as it is.

In Patent Document 4, it is recognized that, when the quantity of dissolved oxygen in water is increased, production of hydrogen is confirmed, and Table 2 in document shows quantities of dissolved oxygen after 1 g of a coral fossil powder was dissolved in 60 cc of pure water. Table 3 in Patent Document 4 shows oxidation reduction potentials. However, the quantity of dissolved oxygen and production of hydrogen are not at all related, and taking into account that the electrode for comparison of oxidation reduction potentials is unknown, and that the oxidation reduction potential decreases by approx. 70 mV with pH being approx. 11 to 12, production of hydrogen cannot be confirmed from the values in Table 3.

Patent Document 5 describes hydrogen water producing particles such as magnesium, obsidian, tourmaline, antibacterial sand, and weathered corals. Among them, a weathered coral cannot serve as a hydrogen water producing particle because of its poor ability to adsorb a hydrogen gas, while only magnesium can serve as a hydrogen water producing particle when it is metal magnesium.

As disclosed in Japanese Patent Laid-Open No. 2005-007380, a coral can be calcinated to form a porous structure, but this alone does not provide a sufficient hydrogen adsorption (attachment).

Means for Solving the Problems

To solve the above-mentioned problems, the method for producing a coral powder used as a supplementary food according to claim 1 comprises the following steps 1 to 4:

Step 1, the step of crushing a coral;
Step 2, the step of contacting the crushed coral with cathode-side electrolytically generated water (alkali ion water);
Step 3, the step of heating the crushed coral to release organic matter in the coral and form micropores in which hydrogen gas molecules can be adsorbed and retained; and
Step 4, the step of contacting the crushed coral with a hydrogen gas to physically adsorb and retain the hydrogen gas in the micropores.

Either Step 2 or 3 may be performed first. The step of contacting the crushed coral with electrolytically generated water is performed by, for example, immersing the crushed coral for 2 to 10 hours in cathode-side electrolytically generated water (alkali ion water) produced by applying 1 to 8 ampere (A) of a direct electric current per liter (L) of an electrolyte solution with an electrical conductivity adjusted to 200 to 1000 µS/cm per min.

Examples of the electrolytes include sodium chloride, potassium chloride, sodium hydrogencarbonate, calcium chloride, and magnesium chloride.

A hydrogen gas is adsorbed and gradually released (sustained release), so that it can effectively function in vivo. To this end, it is preferable to form a micropore having a diameter of 1 nm or greater in the surface of the porous structure by heat treatment and adsorb and retain one or two or more hydrogen gas molecules in this micropore.

The coral powder according to the present invention can be expected to have an adequate effect as a food supplement supplementary, as long as the coral powder has a dissolved hydrogen (DH) concentration in pure water (1 L) of 0.25 ppm or more (25° C., 1 atm).

Thus, a cluster of the adsorbed hydrogen gas is made fine by contacting it with cathode-side electrolytically generated water (alkali ion water), so that the quantity of a hydrogen gas adsorbed can be increased. When the coral is immersed in cathode-side electrolytically generated water (alkali ion water), inorganic components contained in coral such as, for example, calcium and trace metals required for an organism such as zinc, manganese, and iron become easily soluble. Characteristics of the electrolyzed water are changed by applying a direct electric current to the electrolyte solution. For example, surface tension and ion product for water are changed, and permeability and solubility of the cathode-side electrolytically generated water (alkali ion water) are improved. When this property is utilized, calcium and other metals contained in a coral are easily extracted from the coral, and the coral becomes brittle and easily breaks.

Electrolytically generated water obtained by dissolving a supersaturated hydrogen gas in the cathode-side electrolytically generated water (alkali ion water) can be used.

In the step of contacting the coral piece with cathode-side electrolytically generated water (alkali ion water), for example, by immersing the coral piece for 2 to 10 hours in cathode-side electrolytically generated water (alkali ion water) produced by applying 1 to 8 amperes (A) of a direct electric current per liter (L) of an electrolyte solution with an electrical conductivity adjusted to 200 to 1000 μS/cm per min.

Such an adjustment of a conductivity of the electrolyte solution to 200 to 1000 μS/cm facilitates electrolysis, and the current applied is preferably in the range of 1 to 8 amperes (A) per liter (L) per min in that when the current value is too low, electrolysis does not occur, while when the current value is too high, electrolysis occurs vigorously, generating a gas.

In the above step, when the crushed coral is heat-treated, proteins and other organic matter are incorporated between calcium molecules in the coral skeleton, and therefore the organic matter is decomposed and released as volatile components. In the skeleton from which these matters are released, a calcium skeleton in a porous structure is formed, and the surface area of the pores is increased. By adsorbing (attaching) a hydrogen gas to the pores in such a calcium skeleton in a porous structure (micropores), a hydrogen gas can be trapped, that is, retained in the structure.

In general, the oxidation reduction potential of an aqueous solution in which a hydrogen gas is dissolved is lower than that of an aqueous solution in which a hydrogen gas is not dissolved. This is because water acts as an oxidant and hydrogen acts as a reductant. When aqueous solutions have the same hydrogen ion concentration, the value of $\Delta E=E_H-E_O$ is negative.

Advantages of the Invention

A large quantity of a hydrogen gas is adsorbed and retained in a coral powder obtained by the method of the present invention as compared with common coral powders, and therefore, when the coral powder is introduced into the body as a supplementary food, a hydrogen gas is taken up into the body, and a hydroxy radical (.OH), an active oxygen species that is very highly reactive and very toxic, is eliminated as shown in the following reaction formula, so tissue damage by hydroxy radicals can be prevented in an organism.

This is because a hydroxy radical shows strong nucleophilicity as compared with a superoxide radical as shown in the above formula.

When corals, which abundantly contain calcium and trace metals required for an organism, such as selenium and manganese, is immersed in cathode-side electrolytically generated water (alkali ion water), the solubility and permeability of an electrolytically generated solution are improved, and ions are easily dissolved in water. When cathode-side electrolytically generated water (alkali ion water) is permeated into the inside of a coral, trace metals are leached to the coral surface, and therefore inorganic electrolytes can be obtained that are more easily absorbed when ingested into an organism.

Since a hydrogen gas in the fine structure is retained in a relatively stable condition, the coral powder of the present invention can be used for production of foods intended for antioxidation and improvement of plant growth. The addition of a fine zeolite powder provides an improvement in the ability to adsorb and retain a hydrogen gas and the antioxidizing ability.

BEST MODE FOR CARRYING OUT THE INVENTION

COMPARATIVE EXAMPLE 1

1 kg of a dried weathered coral is washed with tap water, then dried, crushed into a size of approx. 5×5 mm with a crusher, and heat-treated in an electric furnace at 730° C. for 2 hours, and then a hydrogen gas is adsorbed or attached to the coral piece in an airtight container at room temperature. The coral piece containing a hydrogen gas is ground with a grinding mill to obtain a coral powder as a fine powder.

Subsequently, aqueous solutions containing the coral powder obtained by heat treatment at 730° C. for 2 hours were prepared and adjusted to predetermined concentrations, and then the oxidation reduction potentials were measured and compared between Sample 1, which contains a hydrogen gas, and a raw solution, which does not contain a hydrogen gas. The results are shown in Table 1 below. Table 1 shows that a hydrogen gas was adsorbed and retained in the coral powder of Comparative Example 1.

TABLE 1

| Oxidation reduction potential (mV) and dissolved hydrogen DH (ppm) | | | | |
| --- | --- | --- | --- | --- |
| g/L | Sample 1 | Raw aqueous solution | ΔE | DH |
| 0.28 | −30 | 10 | −40 | 0.68 |
| 0.3 | −43 | −2 | −41 | 0.69 |
| 0.32 | −52 | −5 | −47 | 0.79 |
| 0.34 | −64 | −9 | −55 | 0.93 |
| 0.36 | −68 | −10 | −58 | 0.98 |
| 0.38 | −74 | −14 | −60 | 1 |
| 0.4 | −82 | −14 | −68 | 1.2 |
| 0.6 | −95 | −18 | −77 | 1.3 |

Here, to adsorb a hydrogen gas, the coral piece (powder) heat-treated in an electric furnace was allowed to stand for cooling to room temperature (20° C.); 50 g of the coral piece (powder) was placed in a 300-mL autoclave; the atmosphere was replaced with a hydrogen gas three times at 0.5 Mpa; the hydrogen gas pressure was increased to 0.8 Mpa; the coral was allowed to stand for 1 hour; the coral piece (powder) was removed and placed into an aluminium-laminated bag; and the bag was sealed.

Alternatively, the following method was attempted to adsorb a hydrogen gas. Specifically, 50 g of the above-mentioned coral piece (powder) after allowed to stand for cooling was placed in a 300 to 500-mL recovery flask, the flask was loaded on a rotary evaporator, and the pressure was reduced with vacuum pump (4 to 5 mmHg) and recovered to the normal pressure with a hydrogen gas. This procedure was repeated three times, the recovery flask was removed from the rotary evaporator, the coral piece (powder) was removed and placed into an aluminium laminated bag, and the bag was sealed.

When heat treatment was performed at 850° C., the coral structure was destroyed. When heat treatment was performed at 250° C., organic matter could not be sufficiently removed. Therefore, the heat treatment temperature appears to be preferably 300 to 800° C.

EXAMPLE 1

1 kg of a dried weathered coral was washed with tap water and sun-dried, and then the dried weathered coral was crushed with a crusher to a size of approx. 5×5 mm. This crushed coral was heat-treated at 300° C. for 4 hours to release organic matter in the coral. Subsequently, an aqueous sodium chloride solution was prepared at an electrical conductivity of 500 µS/cm, and the coral was immersed for 5 hours in cathode-side electrolytically generated water (alkali ion water) produced by electrolysis by applying a 4-A direct electric current per liter of this solution per min and dried. After drying the immersed coral, a hydrogen gas was adsorbed (attached) to the coral piece in an airtight container, and the coral piece was crushed with a grinding mill to approx. 100 mesh.

A coral powder not subjected to the above-mentioned treatment was dissolved in pure water as a control group, and electrical conductivity and oxidation reduction potential were compared.

0.02, 0.04, 0.06, 0.08, and 0.1 g of the fine coral powder of Sample 2 prepared by the above-mentioned method was dissolved in 1 L of water, and the electrical conductivity thereof was measured. As shown in Table 2, the measured electrical conductivity is the difference between the electrical conductivity of a solution when no coral powder was added and the electrical conductivity when a coral powder of each amount was added. Oxidation reduction potentials of Sample 2, which was a hydrogen-containing coral, and the raw aqueous solution, which did not contain hydrogen, were measured using a comparison electrode of a saturated silver chloride electrode, and the results are shown in Table 3.

TABLE 2

| Electrical conductivity (µS/cm) | | |
|---|---|---|
| g/L | Sample 2 | Raw aqueous solution |
| 0.02 | 100 | 80 |
| 0.04 | 240 | 100 |
| 0.06 | 430 | 340 |
| 0.08 | 680 | 530 |
| 0.10 | 890 | 720 |

TABLE 3

| Oxidation reduction potential (mV) and dissolved hydrogen DH (ppm) | | | | |
|---|---|---|---|---|
| g/L | Sample 2 | Raw aqueous solution | ΔE | DH |
| 0.28 | −45 | 0 | −45 | 0.76 |
| 0.3 | −60 | −13 | −47 | 0.79 |
| 0.32 | −72 | −17 | −55 | 0.92 |
| 0.34 | −81 | −21 | −60 | 1 |
| 0.36 | −90 | −25 | −65 | 1.1 |
| 0.38 | −98 | −28 | −70 | 1.2 |
| 0.4 | −109 | −29 | −80 | 1.3 |
| 0.6 | −125 | −31 | −94 | 1.6 |

Tables 2 and 3 show that a large quantity of a hydrogen gas was adsorbed and retained in the coral powder of the present invention. The comparison of the above-mentioned ΔE in Table 1 and ΔE in Table 3 showed that ΔE in Table 3 was greater. This result and the result of dissolved hydrogen suggest that, when a crushed coral is treated with cathode-side electrolytically generated water (alkali ion water), not only trace metals are deposited on the coral surface, but the quantity of a hydrogen gas adsorbed is increased.

EXAMPLE 2

1 kg of a dried weathered coral was washed with tap water and sun-dried, and then the dried weathered coral was crushed with a crusher to a size of approx. 5×5 mm. Subsequently, an aqueous potassium chloride solution was prepared at an electrical conductivity of 500 µS/cm, and the coral was immersed for 5 hours in cathode-side electrolytically generated water (alkali ion water) produced by electrolysis by applying a 7-A direct electric current per liter of this solution per min. Then, this crushed coral was heat-treated at 800° C. for 1 hour to release organic matter in the coral and dried. A hydrogen gas was adsorbed to the dried crushed coral in an airtight container, and then the dried crushed coral was ground with a grinding mill to an approx. 100-mesh fine powder as Sample 3.

Electrical conductivity and oxidation reduction potentials of the solution of Sample 3, which was a coral powder containing a hydrogen gas, dissolved in pure water and a raw aqueous solution, which did not contain a hydrogen gas, were compared.

0.02, 0.04, 0.06, 0.08, or 0.1 g of the coral fine powder prepared by the above-mentioned method was dissolved in 1 L of water, and electrical conductivity was measured. As shown in Table 4, the measured electrical conductivity is the difference between the electrical conductivity of a solution when no coral powder was added and the electrical conductivity when the coral powder of each amount was added. Oxidation reduction potentials of Sample 3 and the control group were measured using a comparison electrode of a saturated silver chloride electrode, and the results are shown in Table 5.

TABLE 4

| Electrical conductivity (µS/cm) | | |
|---|---|---|
| g/L | Sample 3 | Raw aqueous solution |
| 0.02 | 120 | 80 |
| 0.04 | 270 | 100 |
| 0.06 | 490 | 340 |
| 0.08 | 780 | 530 |
| 0.10 | 990 | 720 |

TABLE 5

Oxidation reduction potential (mV) and dissolved hydrogen DH (ppm)

| g/L | Sample 3 | Raw aqueous solution | ΔE | DH |
|---|---|---|---|---|
| 0.28 | −130 | −15 | −115 | 1.9 |
| 0.3 | −133 | −19 | −114 | 1.9 |
| 0.32 | −136 | −23 | −113 | 1.9 |
| 0.34 | −141 | −28 | −113 | 1.9 |
| 0.36 | −153 | −34 | −119 | 2.0 |
| 0.38 | −158 | −38 | −120 | 2.0 |
| 0.4 | −162 | −42 | −120 | 2.0 |
| 0.6 | −171 | −47 | −124 | 2.1 |

Tables 4 and 5 show that a large quantity of a hydrogen gas was adsorbed and retained in the coral powder of the present invention. The comparison of ΔE in the above-mentioned Tables 1 and 3 and ΔE in Table 5 showed that ΔE in Table 5 was greater. This result and the result of dissolved hydrogen suggest that potassium chloride is more effective as an electrolyte than sodium chloride.

EXAMPLE 3

1 kg of a dried weathered coral was washed with tap water and sun-dried, and then the dried weathered coral was crushed with a crusher to a size of approx. 5×5 mm. This crushed coral was heat-treated at 500° C. for 3 hours to release organic matter in the coral. Subsequently, an aqueous sodium hydrogencarbonate solution was prepared at an electrical conductivity of 5000/cm, and the coral was immersed for 5 hours in cathode-side electrolytically generated water (alkali ion water) produced by electrolysis by applying a 7-A direct electric current per liter of this solution per min and dried. A hydrogen gas was adsorbed or attached to a mixture of the dried crushed coral and a fine zeolite powder in a ratio of 1:1 in an airtight container, and the mixture was ground with a grinding mill to an approx. 100-mesh fine powder as Sample 4.

Electrical conductivity and oxidation reduction potentials of Sample 4 obtained by dissolving a mixture of the coral powder, which contained a hydrogen gas, and a zeolite in pure water and a raw aqueous solution, which did not contain a hydrogen gas, were compared.

0.02, 0.04, 0.06, 0.08, or 0.1 g of the mixed powder prepared by the above-mentioned method was dissolved in 1 L of water, and electrical conductivity was measured. As shown in Table 6, the measured electrical conductivity is the difference between the electrical conductivity of a solution when no coral powder was added and the electrical conductivity when the mixed powder of each amount was added. Oxidation reduction potentials of Sample 4 and the control group were measured using a comparison electrode of a saturated silver chloride electrode, and the results are shown in Table 7.

TABLE 6

Electrical conductivity (μS/cm)

| g/L | Sample 4 | Raw aqueous solution |
|---|---|---|
| 0.02 | 190 | 150 |
| 0.04 | 380 | 280 |
| 0.06 | 550 | 440 |
| 0.08 | 830 | 640 |
| 0.10 | 1120 | 820 |

TABLE 7

Oxidation reduction potential (mV) and dissolved hydrogen DH (ppm)

| g/L | Sample | Raw aqueous solution | ΔE | DH |
|---|---|---|---|---|
| 0.28 | −170 | −5 | −165 | 2.9 |
| 0.3 | −192 | −16 | −176 | 3.0 |
| 0.32 | −213 | −20 | −193 | 3.3 |
| 0.34 | −240 | −32 | −208 | 3.5 |
| 0.36 | −261 | −43 | −218 | 3.6 |
| 0.38 | −273 | −58 | −215 | 3.6 |
| 0.4 | −280 | −76 | −204 | 3.4 |
| 0.6 | −291 | −99 | −191 | 3.2 |

Tables 6 and 7 show that a large quantity of a hydrogen gas was adsorbed and retained in the coral powder of the present invention. The comparison of ΔE in the above-mentioned Tables 1, 3, and 5 and ΔE in Table 7 showed that ΔE in Table 7 was the greatest. This result suggests that the quantity of a hydrogen gas adsorbed is increased by adding a zeolite.

Although the present exemplary embodiments of the invention have been described herein, it will be understood that variations and modifications to the present exemplary embodiments are encompassed within the scope of the claims appended hereto.

The invention claimed is:

1. A method for producing a coral powder used as a supplementary food, comprising the following steps 1 to 4:
    Step 1, the step of crushing a coral;
    Step 2, the step of contacting the crushed coral with cathode-side electrolytically generated water (alkali ion water);
    Step 3, the step of heating the crushed coral to release organic matter in the coral and form micropores in which hydrogen gas molecules can be adsorbed and retained; and
    Step 4, the step of contacting the crushed coral with a hydrogen gas to physically adsorb and retain the hydrogen gas in the micropores.

2. The method for producing a coral powder according to claim 1, wherein the step of contacting the crushed coral with cathode-side electrolytically generated water (alkali ion water) is performed by immersing the crushed coral for 2 to 10 hours in cathode-side electrolytically generated water (alkali ion water) obtained by applying 1 to 8 amperes (A) of a direct electric current per liter (L) of an electrolyte solution with an electrical conductivity adjusted to 200 to 1000 μS/cm per min.

3. The method for producing a coral powder according to claim 2, wherein the electrolyte is sodium chloride, potassium chloride, sodium hydrogen carbonate, calcium chloride, or magnesium chloride.

4. A method for producing a coral powder used as a supplementary food, comprising the following steps 1 to 4:
    Step 1, the step of crushing a coral;
    Step 2, the step of heating the crushed coral to release organic matter in the coral and form a micropore in which a hydrogen gas molecule can be adsorbed and retained;
    Step 3, the step of contacting the crushed coral with cathode-side electrolytically generated water (alkali ion water); and
    Step 4, the step of contacting the crushed coral with a hydrogen gas to physically adsorb and retain a hydrogen gas in the micropore.

5. The method for producing a coral powder according to claim 4, wherein the step of contacting the crushed coral with cathode-side electrolytically generated water (alkali ion water) is performed by immersing the crushed coral for 2 to 10 hours in cathode-side electrolytically generated water (alkali ion water) obtained by applying 1 to 8 amperes (A) of a direct electric current per liter (L) of an electrolyte solution with an electrical conductivity adjusted to 200 to 1000 μS/cm per min.

6. The method for producing a coral powder according to claim 5, wherein the electrolyte is sodium chloride, potassium chloride, sodium hydrogen carbonate, calcium chloride, or magnesium chloride.

* * * * *